(12) United States Patent
Zwier

(10) Patent No.: US 7,152,366 B2
(45) Date of Patent: Dec. 26, 2006

(54) EDGING STRIP WITH ENDS HAVING MATING FEATURES

(75) Inventor: Daniel G. Zwier, Holland, MI (US)

(73) Assignee: Permaloc Corporation, Holland, MI (US)

( * ) Notice: Subject to any disclaimer, the term of this patent is extended or adjusted under 35 U.S.C. 154(b) by 0 days.

(21) Appl. No.: 10/991,102

(22) Filed: Nov. 17, 2004

(65) Prior Publication Data
US 2005/0108933 A1 May 26, 2005

Related U.S. Application Data

(60) Provisional application No. 60/523,568, filed on Nov. 20, 2003.

(51) Int. Cl.
*A01G 1/00* (2006.01)
(52) U.S. Cl. ........................................... 47/33
(58) Field of Classification Search .................... 47/33; 52/102, 126.4; 256/24
See application file for complete search history.

(56) References Cited

U.S. PATENT DOCUMENTS

| 2,821,809 | A | * | 2/1958 | Collien et al. | 47/33 |
| 3,332,197 | A | | 7/1967 | Hinkle | |
| 5,020,272 | A | * | 6/1991 | Herrema et al. | 47/33 |
| 5,062,246 | A | * | 11/1991 | Sykes | 52/126.4 |
| 5,301,461 | A | * | 4/1994 | Zwier | 47/33 |
| 5,961,101 | A | * | 10/1999 | Anticole | 256/24 |
| 6,026,610 | A | * | 2/2000 | Northrop et al. | 47/33 |

* cited by examiner

*Primary Examiner*—Francis T. Palo
(74) *Attorney, Agent, or Firm*—Flynn, Thiel, Boutell & Tanis, P.C.

(57) ABSTRACT

An edging strip having improved mating features. The edging strip is an elongate segment of extruded material which has top and bottom edges and front and rear sides. Mating features are provided on the top and bottom edges and are configured to unite with each other only when one edging strip is upside down relative to the other edging strip and axially aligned so that one edging strip is slidable axially relative to the other edging strip to thereby cause an interconnecting mating of the mating features.

8 Claims, 3 Drawing Sheets

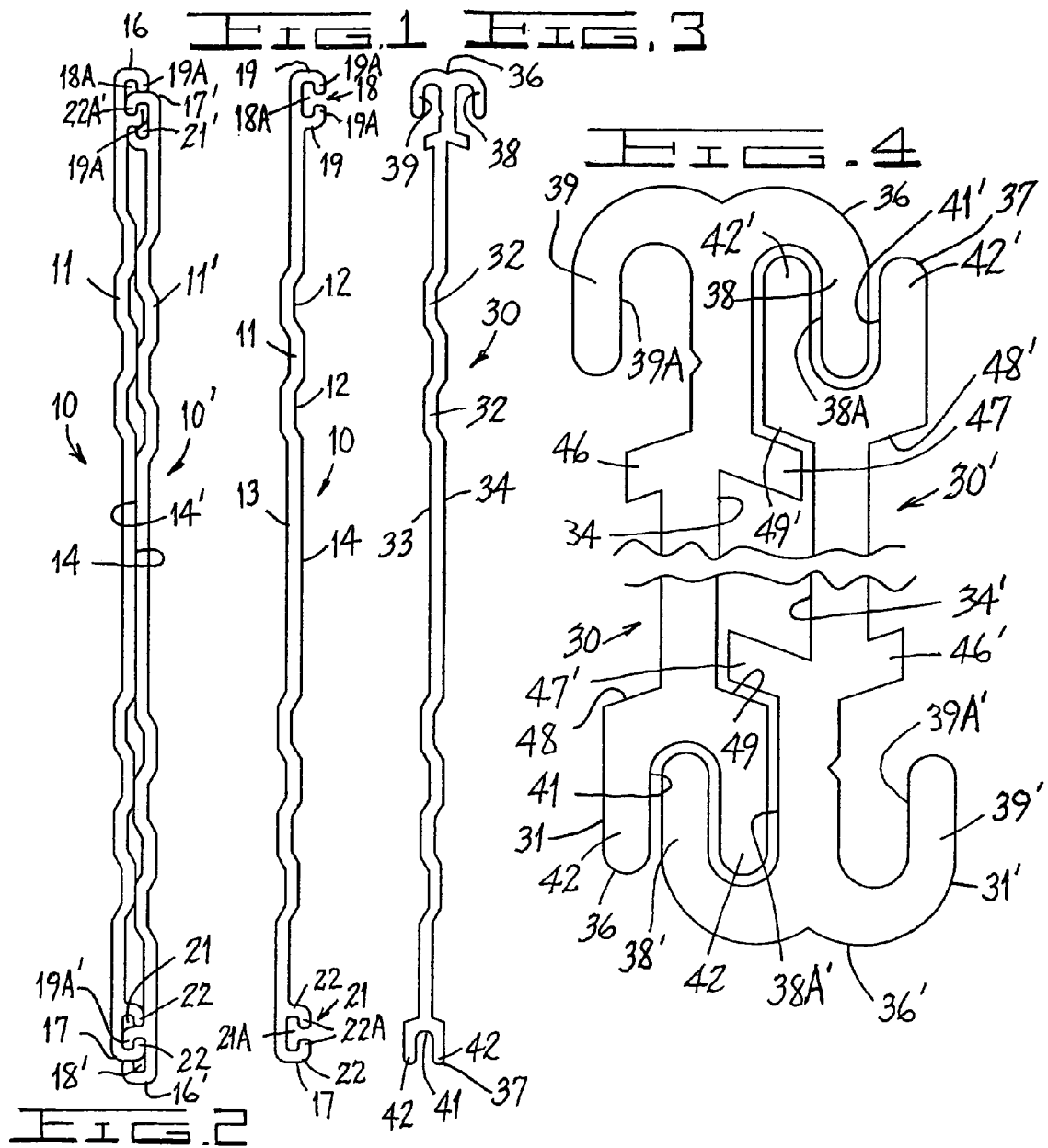

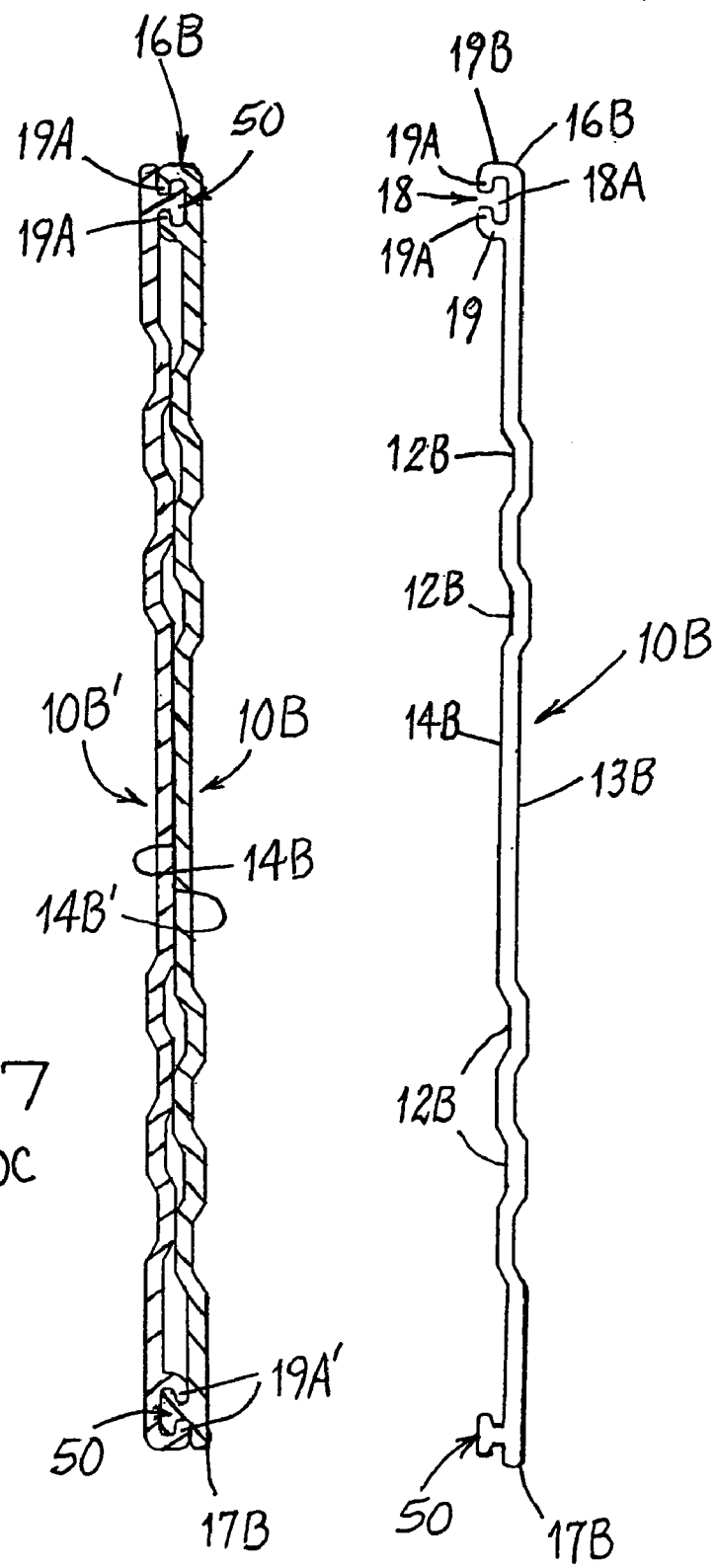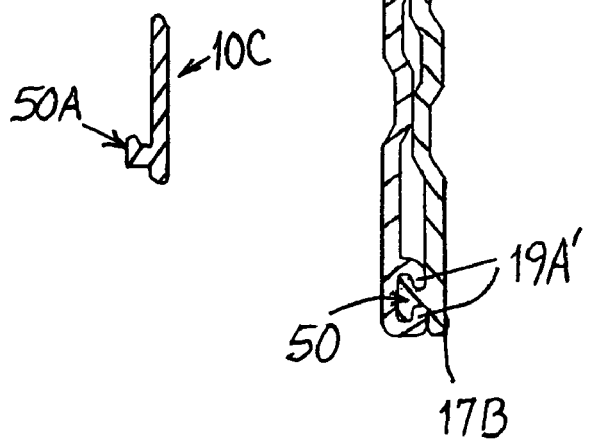

EDGING STRIP WITH ENDS HAVING MATING FEATURES

FIELD OF THE INVENTION

This application claims priority under 35 USC §119(e) of co-pending provisional application Ser. No. 60/523,568, filed Nov. 20, 2003, the entire disclosure of which is herein incorporated by reference.

This invention relates generally to landscaping equipment and, more particularly, to an edging strip having mating features on only one side configured to allow, when there exists two or more of such strips and the aforesaid one sides face one another, two or more edging strips to become interconnected end to end or to form an endless edging construction or to be stacked edge-to-edge one on top of the other.

BACKGROUND OF THE INVENTION

Edging strips are utilized in a number of landscaping applications. These strips are typically formed of elongated segments of extruded aluminum or plastic or rubber. The edging strips are positioned in the ground to form a boundary between a desired area, such as a flower bed or a pathway, and the remainder of the property. While these edging strips could theoretically be manufactured to any length, practicality limits the actual lengths of available edging strips. When two or more edging strips are needed to bound a desired area, it is preferable to mate the strips together to form a single elongate strip. Similarly, when an edging strip, or an elongate strip formed of two or more individual strips, is curved to bound a circular area, it is desirable to mate the ends of the strip together in an endless edging construction. Additionally, some planting beds or grassy areas that are to be bounded by the edging strips often contain root systems that extend deep into the ground. Thus, it is desirable to stack the edging strip edge-to-edge to enable a placement of edging deeper into the ground and yet have an upper edge exposed above the ground.

SUMMARY OF THE INVENTION

The present invention is directed to an edging strip having improved mating features to allow for a reliable connection between two separate and mutually adjacent edging strip ends. The edging strip is an elongate segment of extruded material which has top and bottom edges and front and rear sides. Mating features are provided on only one side of the edging strip and two of such strips are configured to unite with each other only when the aforesaid one sides face one another, are initially axially offset from one another and thereafter one edging strip is slid axially relative to the other edging strip to thereby cause the mating features to interconnect.

BRIEF DESCRIPTION OF THE DRAWINGS

Features and benefits of this invention will be understood by reference to the following detailed description, as well as by reference to the following drawings, in which:

FIG. 1 is an end view of an edging strip embodying the present invention;

FIG. 2 is a cross sectional view of two interlocked edging strip ends according to the FIG. 1 embodiment;

FIG. 3 is an end view of an alternate embodiment of an edging strip embodying the invention;

FIG. 4 is a fragmentary cross sectional view of two interlocked edging strips according to FIG. 3;

FIG. 5 is an end view of a still further embodiment of an edging strip embodying the invention;

FIG. 6 is a cross sectional view of two interlocked edging strips according to the FIG. 5 embodiment;

FIG. 7 is a fragmentary illustration of a modified bead structure;

DETAILED DESCRIPTION

Figure 8:
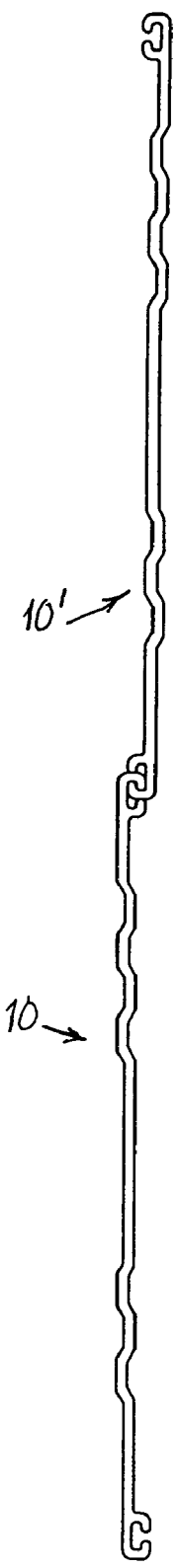
FIG. 8 is an end view of the embodiment of FIG. 1 when the edging strips are stacked edge-to-edge one on top of the other.

Referring to FIG. 1 there is illustrated an end view of an end 11 of an edging strip 10 according to the present invention. The edging strip 10 is preferably formed of an extruded material, such as aluminum or plastic or rubber and, if desired, includes a number of longitudinally extending reinforcing grooves 12 extending along the full length of the strip 10.

The edging strip 10 has a front side 13 and a rear side 14 and top and bottom edges 16 and 17. A side opening C-shaped or U-shaped channel 18 is formed adjacent the top edge 16 along the entire length of the edging strip 10. The channel 18 is defined by two spaced apart and generally parallel walls 19 which extend approximately perpendicularly outwardly from the rear side 14 of the edging strip 10. An identical side opening C-shaped or U-shaped channel 21 opening in the same direction as the channel 18 is formed along the entire length of the bottom edge 17 and also includes spaced apart and generally parallel walls 22 which extend approximately perpendicularly outwardly from the rear side 14 of the edging strip 10. The distal ends of each of the walls 19 are in the form of a right angle section as at 19A so that the interior of the channel 18 has a T-shape as depicted at 18A. Similarly, the distal ends of each of the walls 22 are in the form of a right angle section as at 22A so that the interior of the channel 21 has a T-shape as depicted at 21A.

FIG. 2 illustrates the mating of two edging strip ends 11 and 11'. The ends 11 and 11' are ends of two different edging strips 10 and 10', as illustrated. The second edging strip 10' is identical to the edging strip 10 described above, and therefore, like features of the second strip 10' have been and will be identified with like feature numbers and differentiated from the features of the first strip 10 by the prime ("'") suffix.

The ends 11 and 11' are positioned next to one another so that the rear sides 14 and 14' oppose one another. This can be accomplished by turning one edging strip 180° from top to bottom or 180° left to right. In FIG. 2, the edging strip 10' has been turned 180° top to bottom relative to the edging strip 10 and initially oriented axially offset therefrom. At least the wall section 22A' is axially aligned with the channel 18 and at least the wall section 19A' is axially aligned with the channel 21. This alignment will simultaneously cause the wall section 19A to become axially aligned with the channel 21' and the wall section 22 to become axially aligned with the channel 18'. Thereafter, one edging strip may be slid axially relative to the other until the rear side 14 of the end 11 is directly opposing the rear side 14' of the end 11'. The top edge 16 of the edging strip 10 is adjacent the bottom edge 17' of the edging strip 10' and the bottom edge 17 is adjacent the top edge 16'. Along the top edge 16, one of the distal ends 19A of the channel 18 is interlocked with one of the distal ends 22A' of the channel 21' so that the channel 18 is mated with the channel 21', as illustrated. Similarly, and along the bottom edge 17, one of the distal ends 19A' of the channel 18' is interlocked with one of the distal ends 22 of the channel 21 so that the channel 21 is mated with the channel 18', as illustrated. Since the distal ends 19A, 22A, 19A' and 22A' are in the form of wall sections extending at right angles to the respective walls 19, 19' and 22, 22', the edging strips 10 and 10' will be locked together when the channels are mated. In order to avoid twisting of the edging strips, two or more edging strips can be mated in the manner illustrated in FIG. 2 to create either an endless edging construction or an elongated edging boundary.

It is conceivable that the channels 18 and 21 could be located at locations other than at the top and bottom of the strip. If this is the case, care must be exercised to locate them equidistantly from the respective top and bottom to facilitate mating while maintaining flushness of the strips at the tops and bottoms.

Referring now to FIG. 3, there is illustrated an end view of an end 31 of an edging strip 30 according to an alternate embodiment of the present invention. The edging strip 30 has a number of longitudinally extending reinforcing grooves or reinforcing undulations 32 similar to the grooves 12 formed in the edging strip 10.

The edging strip 30 has a front side 33 and a rear side 34 and top and bottom edges 36 and 37. Adjacent the top edge 36 there are provided a pair of wall sections 38 and 39 which overlap the edging strip from opposite sides to form respective channels 38A and 39A both opening in a direction of and parallel to the general plane of the front and rear sides 33 and 34. Adjacent the bottom edge 37 there is provided two parallel walls 42 straddling the general plane of the edging strip 30 to define a U-shaped channel 41 thereat. The respective legs of the channel 41 are aligned with a corresponding one of the channels 38A and 39A on a common side of the edging strip 30.

FIG. 4 illustrates the mating of two edging strip ends 31 and 31' of two edging strips 30 and 30'. Two edging strips 30 and 30' are first aligned axially with the ends 31 and 31' positioned next to one another so that the top and bottom ends 36 and 37 of the strip 30 are adjacent the bottom and top end 37' and 36', respectively, of the strip 30'. The rear side 34 of the strip 30 directly opposes the rear side 34' of the strip 30' during a relative axial installation movement to cause the wall section 39 of the end 31 to be received into the channel 41' between the walls 42'. Similarly, the wall section 39' of the end 31' is received into the channel 41 between the walls 42. As with the previous embodiment, if the edging strip ends 31 and 31' are the ends of two different edging strips 30 and 30', the edging strip 30' is merely turned upside down and positioned adjacent the edging strip 30 for mating.

Flanges 46 and 47 extend laterally outward from the front and rear sides 33 and 34 and the planes thereof are inclined or perpendicular to the plane of the edging strip. These flanges 46 and 47 (or 46', 47') are configured so that a surface thereon operatively engages further inclined or perpendicular surfaces 48' and 49' on a mutually adjacent and directly opposing edging strip and serve to guide the relative axially sliding movement of the edging strips when the walls 42, 42' are received in channels 38', 38 respectively.

FIG. 5 illustrates a modified edging strip 10B similar to FIG. 1 except that the channel 21 has been replaced with an elongate T-shaped bead 50 extending outwardly from the rear side 14. This modified edging strip 10B will, for the structure componentry that is identical to the FIG. 1 structure, use the same reference character, but with the suffix "B" added thereto.

Referring now to the structure of the bead 50, it has a T-shaped cross section as depicted in FIG. 5. The size and shape of the T-shaped bead 50 is conformed to the size and shape of the channel 18A. Thus, when it is desired to mate the mutually adjacent ends of separate edging strips 10B and 10B' as depicted in FIG. 6, the edging strip 10B' is turned upside down and positioned adjacent the edging strip 10B so that the T-shaped bead 50' is axially aligned with the T-shaped channel 18A and the bead 50 is axially aligned with the T-shaped channel 18A' so that one edging strip can be slid axially relative to the other so that the beads 50 and 50' will enter, respectively, the channels 18A' and 18A. It will be noted that when the strips 10B and 10B' are mated as shown in FIG. 6, the top and bottom edges are flush with each other to provide an aesthetically pleasing appearance when installed.

It is deemed to be within the scope of this invention to provide on a modified edging strip 10C a bead 50A (see FIG. 7) that is L-shaped instead of the T-shaped bead 50 depicted in FIG. 5.

Figure 9:
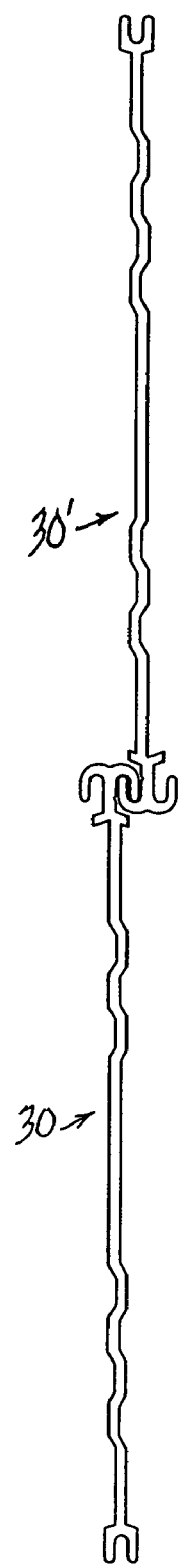
FIG. 9 is an end view of the embodiment of FIG. 3 when the edging strips are stacked edge-to-edge one on top of the other.
Figure 10:
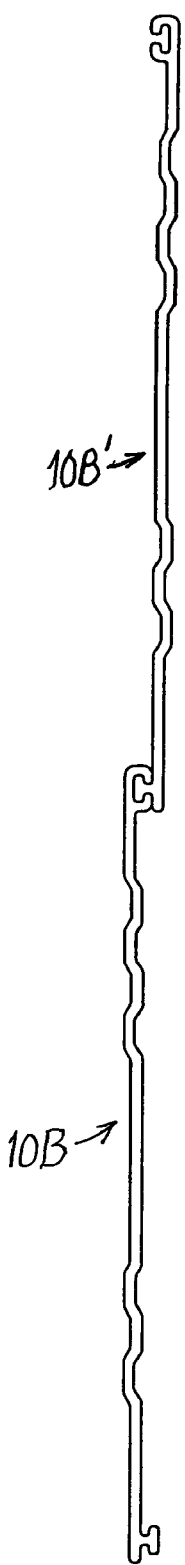
FIG. 10 is an end view of the embodiment of FIG. 5 when the edging strips are stacked edge-to-edge one on top of the other.

As is depicted in FIGS. 8–10, each of the previously described embodiments of FIGS. 1, 3 and 5 can be stacked edge-to-edge one on top of the other in order to accommodate installations that are to extend deep into the ground. If desired, each strip can have an integrally formed ribbon of material forming a loop oriented about a common vertical axis when the strips are stacked in order to accommodate a stake extending therethrough.

Although particular preferred embodiments of the present invention have been disclosed in detail for illustrative purposes, it will be recognized that variations or modifications lie within the scope of the present invention and do not depart from the spirit of the invention, as set forth in the foregoing description and drawings, and in the following claims.

What is claimed is:

1. An edging strip formed of an elongate extruded material having top and bottom longitudinal edges, front and rear sides and first and second ends, said edging strip comprising:
    a first mating profile on one of said front and rear sides and extending axially from said first end to said second end;
    a second mating profile on said one of said front and rear sides and corresponding to said first mating profile and extending axially from said first end to said second end;
    said first and second mating profiles being configured so that at least one of said first and second mating profiles on separate identical edging strips are united with each other only when said edging strips are oriented so that (1) said one side on each identical edging strip opposes the corresponding said one side of the opposing edging strip and (2) said edging strips are displaced relative to one another in a direction perpendicular to the longitudinal axes of said edging strips and lying in a plane of the edging strips with respective said at least one of said first and second mating profiles being axially aligned to facilitate one edging strip being moved axially relative to the other edging strip to cause said at least one of said first and second mating profiles to interconnectingly mate with each other and become connected to each other and incapable of separation in a direction perpendicular to a plane containing a respective said strip.

2. The edging strip according to claim 1, wherein said first and second mating profiles are each a side opening C-shaped or U-shaped channel positioned proximate said top and bottom longitudinal edges and extending axially with said one said front and rear sides.

3. The edging strip according to claim 1, wherein said first and second mating profiles each include a pair of opposing walls defining said C-shaped or U-shaped channel.

4. The edging strip according to claim 1, wherein said first and second mating profiles are each U-shaped channels opening in a direction parallel to a plane of said edging strip.

5. The edging strip according to claim 1, wherein one of said first and second mating profiles is a side opening C-shaped or U-shaped channel which extends along at least one of said front side and said rear side and defines therein a passage that is T-shaped in cross section; and wherein an other of said first and second mating profiles comprises a raised bead configured to conform at least in part to said passage.

6. The edging strip according to claim 5, wherein said bead is T-shaped in cross section.

7. The edging strip according to claim 5, wherein said bead is L-shaped in cross section.

8. The edging strip according to claim 1, wherein said first and second mating profiles on separate identical edging strips are united with each other only when said edging strips are oriented so that said one side on each oppose one another but are axially offset and respective said first and second mating profiles are axially aligned to facilitate one edging strip being moved axially relative to the other edging strip to cause said first and second mating profiles to interconnectingly mate with each other and become connected to each other and incapable of separation in a direction perpendicular to a plane containing a respective said strip.

* * * * *

UNITED STATES PATENT AND TRADEMARK OFFICE
CERTIFICATE OF CORRECTION

| | | |
|---|---|---|
| PATENT NO. | : 7,152,366 B2 | Page 1 of 1 |
| APPLICATION NO. | : 10/991102 | |
| DATED | : December 26, 2006 | |
| INVENTOR(S) | : Daniel G. Zwier | |

It is certified that error appears in the above-identified patent and that said Letters Patent is hereby corrected as shown below:

Column 5, line 5; after "one" insert --of--.

Signed and Sealed this

Tenth Day of April, 2007

JON W. DUDAS
*Director of the United States Patent and Trademark Office*